(12) United States Patent
Xu

(10) Patent No.: US 10,502,350 B2
(45) Date of Patent: Dec. 10, 2019

(54) QUICK WATER INTAKE DEVICE

(71) Applicant: Daoze Xu, Yuhuan (CN)

(72) Inventor: Daoze Xu, Yuhuan (CN)

(73) Assignee: Yuhuan Haolixin Copper Co., Ltd., Yuhuan (CN)

( * ) Notice: Subject to any disclaimer, the term of this patent is extended or adjusted under 35 U.S.C. 154(b) by 58 days.

(21) Appl. No.: 15/829,993

(22) Filed: Dec. 4, 2017

(65) Prior Publication Data
US 2018/0356019 A1    Dec. 13, 2018

(30) Foreign Application Priority Data

Jun. 7, 2017 (CN) .......................... 2017 1 0424821

(51) Int. Cl.
| | | |
|---|---|---|
| *F16L 29/00* | (2006.01) | |
| *F16L 37/23* | (2006.01) | |
| *F16L 37/40* | (2006.01) | |
| *F16K 5/06* | (2006.01) | |
| *F16L 37/42* | (2006.01) | |
| *F16K 27/06* | (2006.01) | |

(52) U.S. Cl.
CPC .......... *F16L 29/007* (2013.01); *F16K 5/0647* (2013.01); *F16K 27/067* (2013.01); *F16L 37/23* (2013.01); *F16L 37/40* (2013.01); *F16L 37/42* (2013.01)

(58) Field of Classification Search
CPC ......... F16L 29/007; F16L 37/23; F16L 37/40; F16L 29/04; F16L 43/00; F16L 37/42; F16L 27/067; F16K 5/0647
USPC ............................. 251/149.1, 149.6; 137/613
See application file for complete search history.

(56) References Cited

U.S. PATENT DOCUMENTS

| | | | | |
|---|---|---|---|---|
| 1,364,440 A | * | 1/1921 | Kraft ....................... | F16L 37/40 251/149.1 |
| 4,498,658 A | * | 2/1985 | Mikiya ................... | F16L 37/23 251/149.6 |
| 5,964,246 A | * | 10/1999 | Meeker .................... | E03B 7/12 137/360 |
| 6,691,978 B1 | * | 2/2004 | Bartos ..................... | F16L 29/02 251/149.6 |
| 6,883,542 B2 | * | 4/2005 | Kuraguchi .............. | F16L 37/40 137/613 |

(Continued)

FOREIGN PATENT DOCUMENTS

CN    201010193112.5    1/2013

*Primary Examiner* — Craig J Price
*Assistant Examiner* — Andrew J Rost
(74) *Attorney, Agent, or Firm* — Minder Law Group; Willy H. Wong

(57) ABSTRACT

A quick water intake device comprises a tubular main body. The main body has a channel, and a first seal core, and an elastic piece. Under the action of the elastic piece, the first seal core can block the channel. A second seal core is also slidably arranged inside the main body. The second seal core is located between the first seal core and an outlet end of the main body, and when subjected to forces, the second seal core can move toward the first seal core and drives the first seal core to compress the elastic piece. A sealing structure arranged between an outer wall of the second seal core and an inner wall of the main body can form a seal between an outer wall of the second seal core and the main body to block the channel when the second seal core moves toward the outlet end.

13 Claims, 3 Drawing Sheets

(56) References Cited

U.S. PATENT DOCUMENTS

| | | | |
|---|---|---|---|
| 6,908,070 B2* | 6/2005 | Bartos | F16L 37/42 |
| | | | 137/242 |
| 7,673,911 B2* | 3/2010 | Liu | F16L 37/23 |
| | | | 285/276 |
| 7,828,266 B2* | 11/2010 | Asai | F16L 37/23 |
| | | | 251/149.6 |
| 2004/0251685 A1* | 12/2004 | Nicolino | F16L 37/40 |
| | | | 285/308 |

* cited by examiner

QUICK WATER INTAKE DEVICE

RELATED APPLICATIONS

This application claims priority to China Patent Application No. CN201710424821.1, filed Jun. 7, 2017.

The applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention pertains to the technical field of pipe fittings, and more particularly to a quick water intake device.

Related Art

Domestic water plays an important role in people's ordinary life. At present, the indoor tap water is generally distributed through water plumbing installed inside walls. Users connect an outlet tap to the outlet end of the plumbing in a threaded connection manner, and then switch the water on and off by controlling the water tap. However, people have much necessity for water in their lives. If water taps are only arranged in a few fixed places, additional hoses are required to connect to the water tap for a long-distance water supply, when water is needed in a place far away from the water tap. It is inconvenient to use the water. If water taps are arranged in all places where water is possibly used, there is a problem of high cost and low utilization.

For this purpose, a quick water intake valve was designed. This quick water intake valve comprises a water intake pipe, a valve body, a bracket, and a spring. The bracket is arranged inside the valve body as the valve core, and the bracket is connected to the spring to achieve switching the water channel of the valve body on and off. A water intake gasket is also arranged on the bracket to achieve the seal when closing the water channel of the valve body. A sealing ring of water intake pipe is also arranged between the water intake pipe and the valve body, to achieve the seal between the water intake pipe and the valve body. When the quick water intake valve is not used, under the elastic force from the spring, the bracket moves outward and seals the channel inside the valve body through the water intake gasket, in order to close the channel. When water is needed, the water intake pipe is inserted into the valve body, to push the compression spring of the bracket out and switch on the water channel of the valve body. This quick water intake valve can be automatically sealed when not used, and water flows out by simply connecting to the water intake pipe when it needs to be used. This can satisfy user's needs and convenience.

However, in this quick water intake valve, the seal of the water intake valve is simply achieved by the water intake gasket on the end of the bracket. If it is used for watering in gardens, green land, and the like, as described in the patent, even if water leaks due to poor sealing performance, leaked water can also be used for irrigation. The requirement for sealing performance is low. However, if this quick water intake valve is used indoors, water leakage is possible due to poor sealing performance of the quick water intake valve, for various reasons such as an offset bracket when reset, insufficient water pressure or elastic force from the spring, worn gasket, etc.

SUMMARY OF THE INVENTION

One objective of one embodiment of the present invention is to avoid the issues stated above in the prior art, and to provide a quick water intake device. One objective of one embodiment of the present invention is to improve the sealing performance of the quick water intake device, on the basis of convenient water intake.

One objective of one embodiment of the present invention can be achieved by the following technical proposal:

One embodiment of a quick water intake device comprises a tubular main body. The main body has a channel, and a first seal core and an elastic piece are arranged inside the channel. Under the action of the elastic piece, the first seal core can block the channel. The main body has an outlet end. It is characterized in that:

A second seal core is also slidably arranged inside the main body. The second seal core is located between the first seal core and the outlet end of the main body, and when subjected to forces, the second seal core can move toward the first seal core and drives the first seal core to compress the elastic piece. A sealing structure is also arranged between the outer wall of the second seal core and the inner wall of the main body. When the second seal core moves toward the outlet end under the elastic force from the elastic piece, the sealing structure can form a seal between the outer wall of the second seal core and the main body, and hence block the channel.

When the quick water intake device is not used, under the elastic force from the elastic piece, the first seal core blocks the channel inside the main body. At the same time, under the elastic force from the elastic piece, the second seal core moves toward the outlet end of the main body. The outer wall of the second seal core and the sealing structure form a side seal to block the channel in tandem. Namely, on the basis of the first seal core used for the seal, in the quick water intake device, a second seal core is added which achieves the seal with the main body laterally. This achieves double seal inside the main body and enhances the sealing performance. In addition, the sealing performance of the side seal of the second seal core is not prone to being affected by offset, and the sealing performance is better. In actual use, a connection pipe may be inserted into the outlet end of the main body, the second seal core is pushed by the end of the connection pipe, and then the first seal core is driven to move inward the main body. The double seal is broken and the channel is connected. Namely, now it is convenient to take and use water.

In one embodiment of the quick water intake device, inside the second seal core, there is an outlet cavity for connection with the connection pipe. An outlet hole connected to the outlet cavity is set up through the side wall of the second seal core and the sealing structure can block the outlet hole. When the connection pipe is inserted, it is inserted into the second seal core, which makes the connection pipe connected to the outlet cavity inside the second seal core and ensures the flow rate of the discharge. In addition, it is easier to seal the outlet hole on the side of the second seal core, and the sealing performance is better.

In one embodiment of the quick water intake device, the second seal core is tubular and the inner end is closed. The sealing structure comprises an annular bracket, and the outer side of the bracket is impermeably fixed on the main body. The second seal core passes through the bracket and the outer wall of the second seal core is attached with an annular first seal ring. The first seal ring is located at the side, which is near the inlet end of the main body, of the outlet hole, and the first seal ring can abut on the bracket and form a seal. The bracket is used to support the second seal core, making the second seal core move inward the main body and forming a water channel between its outer wall and the inner wall of the main body. At the same time, the bracket also provides a steady guide to the movement of the second seal core, allowing the second seal core to move back and forth along the axis of the bracket. This further drives the first seal core to move steadily, avoiding the offset of the first seal core and ensuring the sealing performance.

In one embodiment of the quick water intake device, the inner wall of the bracket and the outer side of the second seal core are both cylindrical surfaces. That both of them are cylindrical surfaces avoids damages on the first seal ring due to collisions of corners, which ensures the integrity and service life of the first seal ring, and improves the sealing performance. At the same time, the fit between the cylindrical surfaces makes relative motion of the parts more smooth and steady, This further allows the first seal core to move more steadily when driven by the second seal core, ensures the channel is sealed steadily, and ensures the sealing performance.

As an alternative situation, in one embodiment of the quick water intake device, the second seal core is tubular and the inner end is closed. The sealing structure comprises an annular sealing washer fixed onto the main body, and the annular sealing washer can block the outlet hole. The sealing structure may simply be a sealing washer as well. The channel may also be blocked by enveloping the whole outlet hole with this sealing washer. After the second seal core moves inward the main body, the sealing washer can not envelop all the outlet holes, and the channel is opened again.

In one embodiment of the quick water intake device, the elastic piece comprises a first spring and a second spring. Under the elastic force from the first spring, the first seal core can block the channel inside the main body. Under the elastic force from the second spring, the second seal core can block the channel inside the main body. The first seal core and the second seal core are driven by the first spring and the second spring respectively. This avoids the situation where the seal core can not seal the system effectively because a single elastic piece loses the elasticity, and ensures the effectiveness of seal.

In one embodiment of the quick water intake device, there is a protruding bumper on the outer end face of the first seal core. A gasket used to block the channel inside the main body is sleeved over the outer side of the bumper. The inner end of the second seal core can abut on the outer end of the bumper. A protruding bumper used to abut on the second seal core is arranged on outer end of the first seal core. This prevents the second seal core from abutting on the gasket of the first seal core directly, avoids the deformation of the gasket, and ensures the sealing performance.

In one embodiment of the quick water intake device, on the outer side of the first seal core, there are several protruding limiters used to limit the radial position of the first seal core. The limiters are arranged around the axis of the main body and outside the first seal core. In order for the water to pass through the first seal core, there must be a clearance between the outer side of the first seal core and the inner wall of the main body. In order to prevent the first seal core from offsetting during the movement, several limiters are arranged on the outer side of the first seal core to allow the first seal core to move back and forth along the axis of the main body. This ensures the effectiveness of seal.

In one embodiment of the quick water intake device, an attacher used to axially fix the connection pipe is arranged on the outlet end. When the connection pipe is inserted for water intake, the connection pipe may be fixed by the attacher. The water can outflow steadily without the user holding the connection pipe all the time.

In one embodiment of the quick water intake device, several locking holes are arranged through the side of the outlet end, and the locking holes are placed around the axis of the outlet end. The attacher comprises a homing spring, several steel balls, and a cylindrical locking sleeve. These steel balls are correspondingly arranged inside the locking holes one by one. Under the elastic force from the homing spring, the locking sleeve can push the steel balls partially into the main body. The outer end of the second seal core has a detacher that, while moving toward the outlet end, so that the steel balls do not enter the main body outlet end. When the connection pipe is inserted, the steel ball partially enters the main body under the action of the locking sleeve, and then snaps the connection pipe tight. After the water usage is over, the locking sleeve is pushed to compress the spring so that it frees the steel ball. When the connection pipe is pulled out, the steel ball is pushed back into the locking holes. Meanwhile, the second seal core moves outward under the elastic force from the elastic piece, and blocks the steel ball by the detacher so that it can not enter the main body. Hence, the connection pipe may be inserted straightly for the next time. There is no need to push the locking sleeve again because the steel ball is pushed into the main body by the locking sleeve. It is convenient for the use.

In one embodiment of the quick water intake device, there is a guide surface in the inner wall of the detacher to facilitate the connection pipe to insert. The guide surface is used to guide the insertion of the connection pipe, and facilitates the insertion of the connection pipe.

In one embodiment of the quick water intake device, the quick water intake device also comprises a housing having a mounting cavity. A water intake port connected to the mounting cavity is arranged on one side the housing. The main body is fixed inside the mounting cavity of the housing, and the opening of the outlet end is facing the water intake port. The installation of the quick water intake device is similar to that of a socket. The whole main body is installed inside the housing and then embedded into a wall. When in use, the connection pipe can simply be inserted into the corresponding water intake port, and when not in use, the main body is not exposed outside. It is convenient for the use and little space is taken.

In one embodiment of the quick water intake device, a valve, capable of controlling the on-off state of the channel inside the main body, is also connected to the main body, between the inlet end and the first seal core. When a part inside the main body is broken or needs inspection or replacement, the water flow into the main body can be shut by the control valve. It may be opened again after the parts inside the main body are replaced. It is convenient for repair and replacement.

Compared to the prior art, when the quick water intake device is not in use, a preliminary seal of the channel inside the main body is achieved by the end part of the first seal core, and then a secondary seal of the channel inside the main body is achieved by the side part of the second seal core. The sealing performance is good. When in use, the connection pipe may be straightly inserted into the main body to push the second seal core and then the first seal core to move together. The channel is opened for the water intake, and it is convenient for use.

DETAILED DESCRIPTION OF THE INVENTION

The embodiments of this invention will be described below and the technical solutions of the invention will be further illustrated in connection with the accompanying figures. However, the present invention shall not be limited to these embodiments.

Figure 1:
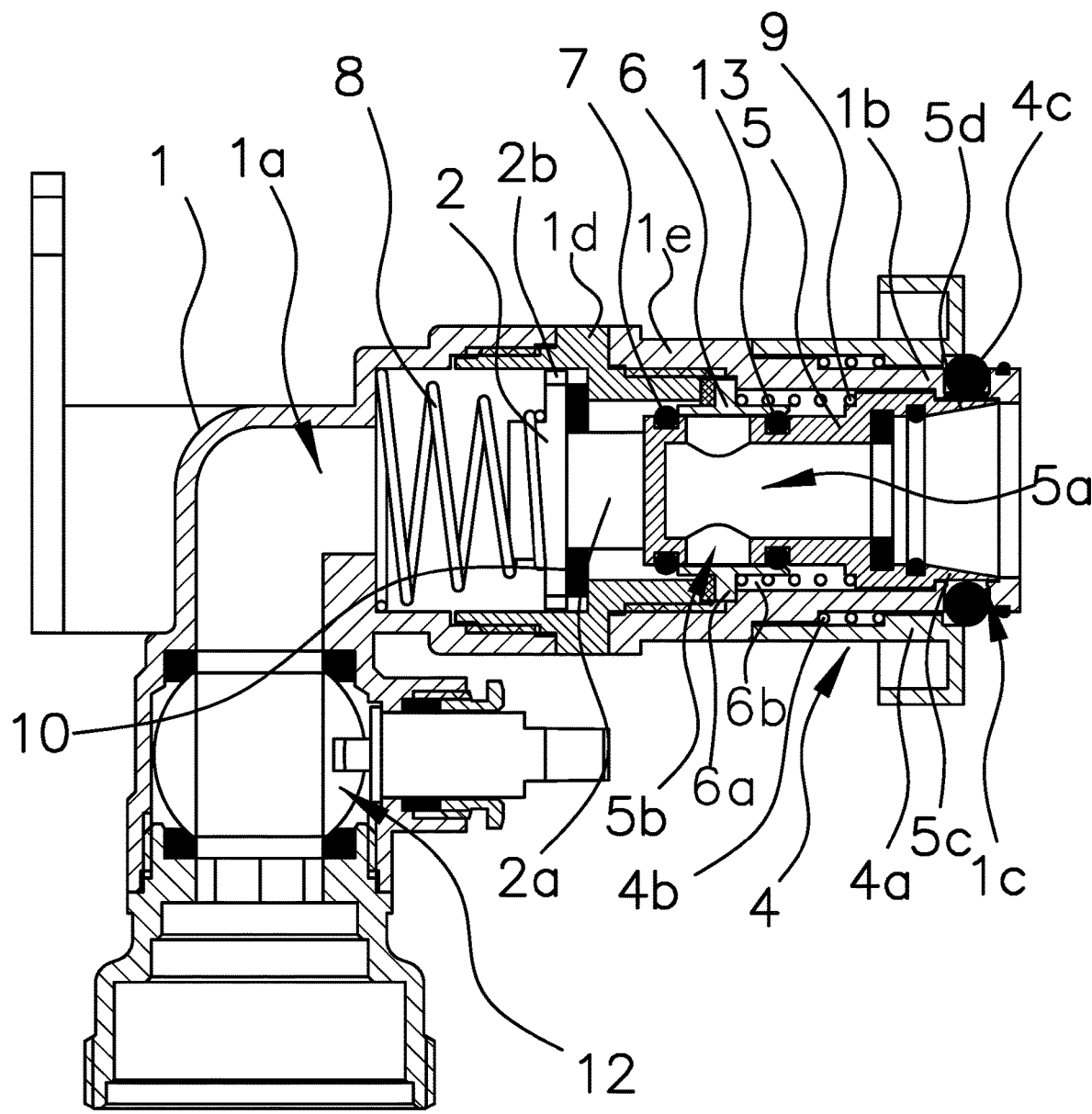
FIG. 1 is a sectional view of one embodiment of the quick water intake device.
Figure 2:
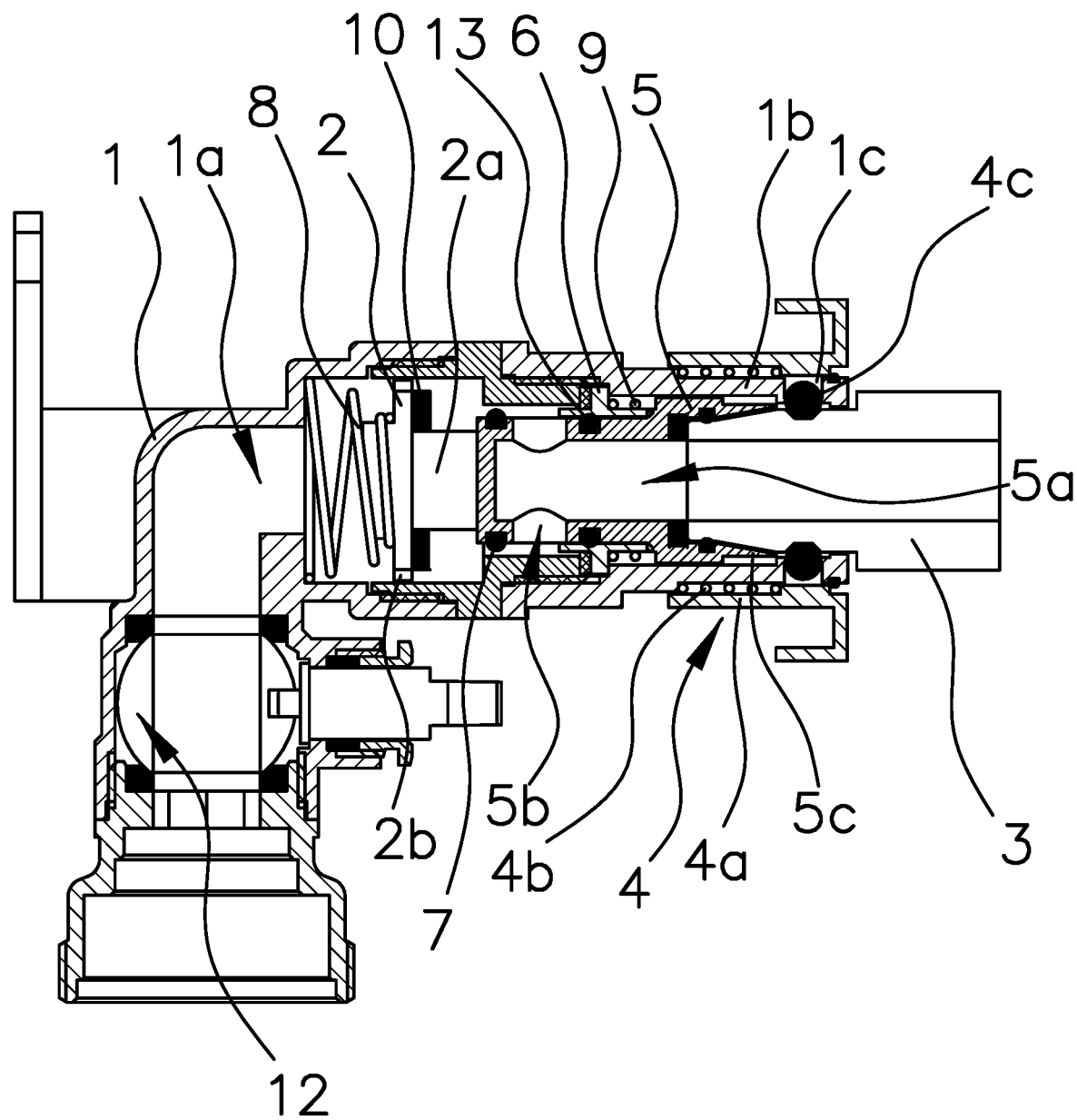
FIG. 2 is a sectional view of one embodiment of the quick water intake device when a connection pipe is connected.
Figure 3:
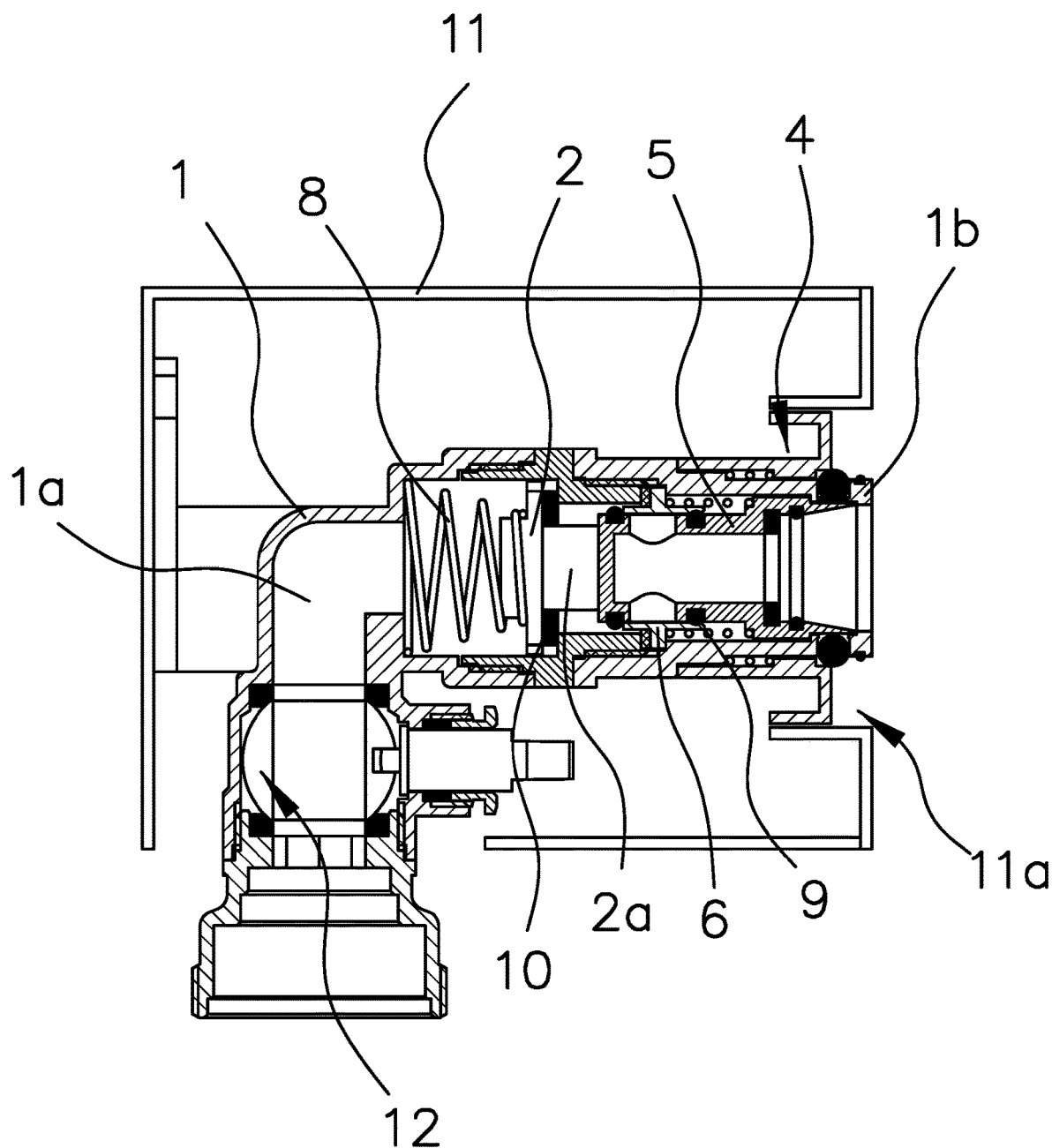
FIG. 3 is a sectional view of one embodiment of the quick water intake device when installed inside a housing.

As shown in FIG. 1, and FIG. 2, one embodiment of the quick water intake device comprises a tubular main body (1), and there is a channel (1a) inside the main body (1). The main body (1) consequently comprises a thread-connected elbow zone bended at a right angle, a cylindrical transition zone, and an exit zone. A valve (12) capable of controlling the on-off state of the channel (1a) inside the main body (1) is connected onto the elbow zone. In this embodiment, a ball valve is adopted as the valve (12), while no handle is arranged for the ball valve. A flat or cruciform slot may be set up on the outer end face of the valve rod of the ball valve, for tool insertion and operation The first spring (8), the first seal core (2), the second spring (9), and the second seal core (5) are successively arranged in the main body (1), from the elbow zone to the exit zone. Here a sealing structure capable of sealing the side surface of the second seal core (5) is arranged between the outer side surface of the second seal core (5) and the inner wall of the main body (1). There is an outlet end (1b) at the exit zone of the main body (1), and the outlet end (1b) has an attacher (4) used to axially fix the connection pipe (3). Under the elastic force from the first spring (8), the first seal core (2) can block the channel (1a) inside the main body (1). Under the elastic force from the second spring (9), the second seal core (5) can block the channel (1a) inside the main body (1).

Specifically, one embodiment of the first seal core (2) comprises a disc shaped sealing disk, a cylindrical mounting post protruding from the inner end face of the sealing disk, and a cylindrical bumper (2a) protruding from the outer end face of the sealing disk. The outer end face of the bumper (2a) is flat. A gasket (10) used to block the channel (1a) inside the main body (1) is sleeved over the outer side of the bumper (2a), and the gasket (10) is fixed onto the sealing disk. The first spring (8) is a spring. Its inner end abuts on the elbow zone, and the outer end is sleeved over the outer side of the mounting post and abuts on the inner end of the sealing disk. Under the elastic force from the first spring (8), the gasket (10) on the first seal core (2) can abut on the transition zone and form a seal to block the channel (1a). In one embodiment, in order for the first seal core (2) to move more steadily and without offset, on the outer side of the sealing disk, there are several protruding limiters (2b) used to limit the radial position of the first seal core (2). The limiters (2b) are arranged around the axis of the main body (1) and outside the sealing disk. Here, there are at least 3 limiters (2b).

One embodiment of the second seal core (5) is tubular. The inside of the second seal core (5) is outlet cavity (5a) and the inner end is closed. The inner end face of the second seal core (5) is flat and abuts on the outer end face of the bumper (2a) on the outer end of the first seal core (2). Several outlet holes (5b) are formed through the side of the second seal core (5), and these outlet holes (5b) are arranged around the axis of the second seal core (5). The sealing structure above comprises an annular bracket (6). The outer side of the bracket (6) is impermeably fixed on the main body (1), and a locating groove (6b) is formed between the outer wall of the bracket (6) and the main body (1). The second seal core (5) passes through the bracket (6) and the outer wall of the second seal core (5) is attached with the annular first seal ring (7) and the second seal ring (13). The first seal ring (7) and the second seal ring (13) are both arranged coaxially with the second seal core (5), and the first seal ring (7) and the second seal ring (13) are arranged on a side near the water inlet end of the outlet holes (5b), and a side near the outlet end (1b), respectively. The first seal ring (7) and the second seal ring (13) can abut on the bracket (6) at the same time, and form a seal on the front and rear sides of the outlet hole (5b). In one embodiment, the outer wall of the bracket (6) has an annular and protruding anchor (6a). The main body (1) comprises a transition zone (1d) and an exit zone (1e). The anchor (6a) is pressed firmly between the transition zone (1d) and the exit zone (1e), and a sealing element is fixed between the anchor (6a) and the transition zone (1d). In one embodiment, the inner wall of the bracket (6) and the outer side of the second seal core (5) are both cylindrical. The outer wall of the second seal core (5) also has a shoulder, and the shoulder is located between the bracket (6) and the opening of the outlet end (1b). The second spring (9) above is a spring. The inner end of the second spring (9) is located inside the locating groove (6b) and abuts on the anchor of the bracket (6), and the outer end abuts on the shoulder.

Several locking holes (1c) are arranged through the side of the outlet end (1b), and the locking holes (1c) are placed around the axis of the outlet end (1b). The attacher (4) comprises a cylindrical locking sleeve (4a), a homing spring (4b), and several steel balls (4c). These steel balls (4c) are correspondingly arranged inside the locking holes (1c) one by one. Under the elastic force from the homing spring (4b), the locking sleeve (4a) can push the steel balls (4c) partially into the main body (1). In one embodiment, at the outlet end (1b), there is a protruding retainer at the side wall of each locking hole (1c). The protruding retainer can allow the steel ball (4c) to partially enter the main body (1) and prevent the entire steel ball (4c) from dropping into the main body (1).

On the outer end of the second seal core (5), there is also an annular detacher (5c), which makes the steel ball (4c) not enter the main body (1) when the second seal core (5) moves toward the opening of the outlet end (1b) under the elastic force from the elastic piece. On the inner wall of the detacher (5c), there is a guide surface (5d) for easy connection pipe (3) insertion, and the guide surface (5d) is conical.

When one embodiment of the quick water intake device is in use, the main body (1) is fixed inside the housing (11) having a mounting cavity, by a mounting frame fixedly connected to the rear side of the main body (1). A water intake port (11a) communicated to the mounting cavity is arranged on one side the housing (11), and the opening of the outlet end (1b) of the main body (1) is facing the water intake port (11a) On the outer side of the outer end of the locking sleeve (4a) sleeved over the outlet end (1b) of the main body (1), there is also a push collar that is rolled outward. The push collar aligns with the water intake port (11a). In one embodiment, the housing (11) may comprise a face panel snap-connected onto the front side of the housing (11). The water intake port (11a) is formed through the face panel. A lid is also hinged to the front side of the outer side, and the lid may cover the whole water intake port (11a). For easy repair and replacement, the inlet end of the main body (1) may be connected to the water supply pipe with a quick coupling structure. The specific quick coupling structure may be the same as that in the attacher (4), or a quick coupling structure of snap-claw type may be used.

When one embodiment of the quick water intake device is not in use, under the elastic force from the first spring (8) and the second spring (9), the first seal core (2) moves outward, and blocks the channel (1a) inside the main body (1) by the gasket (10). At the same time, the second seal core (5) also moves toward the outlet end (b) of the main body (1), and blocks the channel (1a) inside the main body (1) in tandem, by the seal formed between the first seal ring (7) and the second seal ring (13) sleeved over the outer wall of the second seal core (5) and the bracket (6). The steel ball (4c) at the outlet end (1b) is held outside the inner cavity of the main body (1) by the detacher (5c) of the second seal core (5). with the push collar depressed, The locking sleeve (4a) retracts backward and compresses the homing spring (4b).

In actual use of one embodiment of the quick water intake device, the lid is flipped open, a connection pipe (3) is inserted into the water intake port (11a) and the outlet end (1b) of the main body (1), the second seal core (5) is pushed by the end of the connection pipe (3), compressing the first spring (8). Then the first seal core (2) abutting on the second seal core (5) is driven to move inward the main body (1). The double seal is released and the channel is connected. At this point, the second seal core (5) is pushed away, the detacher (5c) detaches from the locking hole (1c), and the locking sleeve (4a) moves forward under the elastic force from the homing spring (4b) and acts on the steel ball (4c). This makes the steel ball (4c) partially enter the main body (1), and jams the annular groove on the outer wall of the connection pipe (3), achieving the axially fixation of the connection pipe (3). Now it is convenient to take and use the water.

After the water usage is over, by pressing the push collar the locking sleeve (4a) to compress the homing spring (4b) backward, the blocking on the steel ball (4c) is removed. When the connection pipe (3) is pulled out, the steel ball (4c) is pushed into the locking hole (1c) by the outer wall of the connection pipe (3). At this point, the second seal core (5) moves outward under the elastic force from the second spring (9), and blocks the steel ball (4c) by the detacher (5c) so that it can not enter the main body (1). Hence, the connection pipe (3) may be inserted straightly for the next time. There is no need to push the locking sleeve (4a) again because the steel ball (4c) is pushed into the main body (1) by the locking sleeve (4c). It is convenient for the use.

When the connection pipe (3) is inserted, in order to ensure the sealing performance between the connection pipe (3) and the second seal core (5), an annular sealing washer used to abut on the end of the connection pipe (3), as well as an O-ring used to abut on the outer wall of the connection pipe (3) are fixed onto the inner side of the outer end of the second seal core (5), respectively.

Besides the proposal shown above, one embodiment of the sealing structure may also comprise an annular sealing washer fixed onto the main body (1), and the annular sealing washer can block the outlet hole (5b). The water channel may also be blocked by enveloping the whole outlet hole (5b) with this sealing washer. After the second seal core (5) moves inward the main body (1), the sealing washer can not envelop the whole outlet hole (5b), and the channel (1b) is opened again.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

LIST OF REFERENCE NUMERALS

1. Main Body
1a. Channel
1b. Outlet End
1c. Locking Hole
1d. transition zone
1e. exit zone
2. First Seal Core
2a. Bumper
2b. Limiter
3. Connection Pipe
4. Attacher
4a. Locking Sleeve
4b. Homing Spring
4c. Steel Ball
5. Second Seal Core
5a. Outlet Cavity
5b. Outlet Hole
5c. Detacher
5d. Guide Surface
6. Bracket
6a. anchor
6b. Locating Groove
7. First Seal Ring
8. First Spring
9. Second Spring
10. Gasket
11. Housing
11a. Water Intake Port
12. Valve
13. Second Seal Ring

What is claimed is:

1. A quick water intake device comprising:
 a tubular main body (1) having a channel (1a) and an outlet end (1b);
 a first seal core (2);
 an elastic piece, the elastic piece and the first seal core (2) are arranged inside the channel (1a);
 a second seal core (5) slidably arranged inside the main body (1), the second seal core (5) located between the first seal core (2) and the outlet end (1b) of the main body (1); and
 a sealing structure arranged between an outer wall of the second seal core (5) and an inner wall of the main body (1);
 wherein the sealing structure comprises an annular bracket (6) and an annular first seal ring (7), the annular first seal ring (7) attached on an outer wall of the second seal core (5) is located at a side of the outlet hole (5b) near the first seal core (2), and the second seal core (5) with an outlet hole (5b) passes through the bracket (6), an outer side of the bracket (6) is impermeably fixed on the main body (1), and the first seal ring (7) is capable of abutting on the bracket (6) and is capable of forming a seal;

wherein a space is formed between an inner wall of the main body (1) and an outer wall of the bracket (6), a second spring (9) is located between the bracket (6), and an inner side of the outlet end (1b) and a part of the second spring (9) is arranged in the space;

wherein under an action of the elastic piece, the first seal core (2) is capable of blocking the channel (1a);

wherein when subjected to forces, the second seal core (5) is capable of moving toward the first seal core (2) and drives the first seal core (2) to compress the elastic piece; and wherein when the second seal core (5) moves toward the outlet end (1b) under an elastic force from the elastic piece, the sealing structure is capable of forming a seal between an outer wall of the second seal core (5) and the main body (1), blocking the channel (1a).

2. The quick water intake device as claimed in claim 1, further comprising:
   a connection pipe (3);
   an outlet cavity (5a) inside the second seal core (5), the outlet cavity (5a) capable of connecting with the connection pipe (3);
   wherein the outlet hole (5b) is connected to the outlet cavity (5a), and the outlet hole (5b) is set up through a side wall of the second seal core (5); and
   wherein the sealing structure is capable of blocking the outlet hole (5b).

3. The quick water intake device as claimed in claim 2 wherein the second seal core (5) is tubular and an inner end of the second seal core (5) is closed.

4. The quick water intake device as claimed in claim 3 wherein an inner wall of the bracket (6) and an outer side of the second seal core (5) are both cylindrical surfaces.

5. The quick water intake device as claimed in claim 2, further comprising:
   an annular sealing washer of the sealing structure, the annular sealing washer is fixed onto the main body (1) and is capable of blocking the outlet hole (5b);
   wherein the second seal core (5) is tubular and an inner end of the second seal core (5) is closed.

6. The quick water intake device as claimed in claim 2, further comprising:
   an attacher (4) arranged on the outlet end (1b), the attacher (4) capable of axially fixating the connection pipe (3).

7. The quick water intake device as claimed in claim 6, further comprising:
   several locking holes (1c) arranged through a side of the outlet end (1b), the locking holes (1c) placed around an axis of the outlet end (1b);
   a cylindrical locking sleeve (4a) of the attacher (4);
   a homing spring (4b) of the attacher (4); and
   several steel balls (4c) of the attacher (4), the steel balls (4c) correspondingly arranged inside the locking holes (1c) one by one;
   wherein under an elastic force from the homing spring (4b), the locking sleeve (4a) is capable of pushing the steel balls (4c) partially into the main body (1); and
   wherein an outer end of the second seal core (5) has a detacher (5c) capable of preventing the steel balls (4c) from entering the main body (1) while the detacher (5c) moves toward a mouth of the outlet end (1b).

8. The quick water intake device as claimed in claim 7, further comprising:
   a guide surface (5d) in an inner wall of the detacher (5c) capable of facilitating the connection pipe (3) to enter.

9. The quick water intake device as claimed in claim 1, further comprising:
   a first spring (8) of the elastic piece;
   wherein under an elastic force from the first spring (8), the first seal core (2) is capable of blocking the channel (1a) inside the main body (1).

10. The quick water intake device as claimed in claim 1, further comprising:
    a protruding bumper (2a) on an outer end face of the first seal core (2);
    a gasket (10) sleeved over an outer side of the bumper (2a), the gasket (10) capable of blocking the channel (1a) inside the main body (1); and
    an inner end of the second seal core (5) capable of abutting on an outer end of the bumper (2a).

11. The quick water intake device as claimed in claim 1, further comprising:
    several protruding limiters (2b) on an outer side of the first seal core (2);
    wherein the limiters (2b) are capable of limiting a radial position of the first seal core (2); and
    wherein the limiters (2b) are arranged around an axis of the main body (1) and outside the first seal core (2).

12. The quick water intake device as claimed in claim 1, further comprising:
    a housing (11) having a mounting cavity; and
    a water intake port (11a) connected to the mounting cavity is arranged on a side of the housing (11);
    wherein the main body (1) is fixed inside the mounting cavity of the housing (11); and
    wherein an opening of the outlet end (1b) is facing the water intake port (11a).

13. The quick water intake device as claimed in claim 1, further comprising:
    a valve (12) connected to the main body (1), the valve (12) capable of controlling an on-off state of the channel (1a) inside the main body (1);
    wherein the valve (12) is between an inlet end of the main body (1) and the first seal core (2).

* * * * *